(12) United States Patent
Kang et al.

(10) Patent No.: US 8,242,791 B2
(45) Date of Patent: Aug. 14, 2012

(54) AREA-VARIABLE TYPE CAPACITIVE DISPLACEMENT SENSOR HAVING MECHANICAL GUIDE

(75) Inventors: Daesil Kang, Busan (KR); Wonkyu Moon, Pohang-si (KR)

(73) Assignee: Postech Academy-Industry Foundation, Pohang-shi, Kyungsangbuk-do (KR)

( * ) Notice: Subject to any disclaimer, the term of this patent is extended or adjusted under 35 U.S.C. 154(b) by 287 days.

(21) Appl. No.: 12/453,710

(22) Filed: May 20, 2009

(65) Prior Publication Data
US 2009/0289641 A1 Nov. 26, 2009

(30) Foreign Application Priority Data
May 23, 2008 (KR) .................. 10-2008-0047941

(51) Int. Cl.
*G01R 27/26* (2006.01)
(52) U.S. Cl. ........ 324/662; 324/658; 324/660; 324/649; 73/780
(58) Field of Classification Search ............... 324/662
See application file for complete search history.

(56) References Cited

U.S. PATENT DOCUMENTS

| 7,345,773 | B2 * | 3/2008 | Yano ........................ 356/628 |
| 7,347,102 | B2 * | 3/2008 | Moon et al. .................. 73/780 |
| 2007/0034013 | A1 | 2/2007 | Moon et al. |
| 2007/0112458 | A1 * | 5/2007 | Kondo et al. ............... 700/213 |

FOREIGN PATENT DOCUMENTS

| DE | 39 23 042.2 | 1/1991 |
| JP | 3-123814 | 5/1991 |
| KR | 10-0547275 | 1/2006 |
| WO | 96/41999 | 12/1996 |

* cited by examiner

*Primary Examiner* — Bot LeDynh
*Assistant Examiner* — Son Le
(74) *Attorney, Agent, or Firm* — Bacon & Thomas, PLLC

(57) ABSTRACT

An area-variable type capacitive displacement sensor includes: a stationary element; a movable element; an elastic member for providing a force biasing one of the stationary element and the movable member towards a remaining one thereof in a direction perpendicular to a driving direction so that the stationary element and the movable member are maintained in close contact with each other; a power supply; and a signal detecting circuit. The sensor further includes a guide means for correcting an initial alignment error and reducing an operation alignment error between the stationary element and the movable element.

1 Claim, 5 Drawing Sheets

AREA-VARIABLE TYPE CAPACITIVE DISPLACEMENT SENSOR HAVING MECHANICAL GUIDE

FIELD OF THE INVENTION

The present invention relates to area-variable type capacitive displacement sensors having mechanical guides; and, more particularly, to an area-variable type capacitive displacement sensor having a guide means for defining and maintaining a gap defined in the sensor and compensating for an alignment error of the sensor.

BACKGROUND OF THE INVENTION

As is well known to those skilled in the art, an area-variable type capacitive displacement sensor is a device for measuring a minute linear displacement, outputting an electric signal indicating a variation in capacitance corresponding to the displacement between two conductive plates.

In the area-variable type capacitive displacement sensor, when the two conductive plates are disposed to face with each other in parallel, the capacitance between the two conductive plates is approximately proportional to a dielectric constant of a medium interposed therebetween and an area of the two plates facing each other, whereas the capacitance is approximately inversely proportional to a gap, i.e., a distance therebetween. That is, when the distance or an overlapped area between the two plates is varied as the two plates move relative to each other, the capacitance also varies. This phenomenon is the principle which is used for measuring a displacement between the two plates.

Capacitive displacement sensors can be classified into two types based on their measurement methods: one type is to detect a variation in a gap between two facing plates in the perpendicular direction when they are moved with respect to each other; and the other type is to detect a variation in an overlapped area between two plates when they move with respect to each other in parallel. The related matters are disclosed in detail in Chapter three of "capacitive sensors", Baxter, IEEE, 1997.

So far, a method using the measurement of a variation in a gap (a space) between two facing plates has been used to measure a minute displacement, because the method is advantageous in that it exhibits a high sensitivity to displacement and has a relatively simple structure. However, this method has the disadvantage that the range of displacement which can be measured is very limited because the sensitivity rapidly decreases non-linearly as the displacement increases. Furthermore, this method is very sensitive to a mechanical installation error, so that much effort is required for the installation of the displacement sensor. Particularly, in the case of this method, the reliability of measurement may be reduced due to an abbe error, a cosine error or the like that is induced by a discrepancy between a driving direction (that is a horizontal direction) and a measurement direction (that is a vertical direction). Further, the method is disadvantageous in that the space utilization is poor.

In an effort to overcome the above problems, a contact type electric capacitive displacement sensor was proposed in Korean Patent Registration No. 10-0547275 (date: Jan. 20, 2006, Patent family: U.S. Pat. No. 7,347,102). As shown in FIG. 1, the conventional contact type electric capacitive displacement sensor includes a stationary element 10, a movable element 20, an elastic member 30, an AC power supply 40, a signal detecting circuit 50 and a drive unit A. The stationary element 10 includes a stationary plate 12, a conductive pattern 14 which is formed on the stationary plate 12, and a thin dielectric film 16 which is evenly applied to the surface of the conductive pattern 14. In the same manner as the stationary element 10, the movable element 20 includes a movable plate 22, a conductive pattern 24 which is formed on the movable plate 22, and a thin dielectric film 26 which is evenly applied across the surface of the conductive pattern 24. The movable element 20 is disposed such that the dielectric film 26 is in contact with the dielectric film 16 of the stationary element 10. Thus, when the movable element 20 moves with respect to the stationary element 10 in a parallel direction, an area of overlap between the conductive patterns 14 and 24 is varied. The elastic member 30 provides a force to bias one of the stationary element 10 and the movable member 20 towards the remaining one of them in a direction perpendicular to a driving direction such that the stationary element 10 and the movable member 20 are maintained in the state of being in close contact with each other. The AC power supply 40 supplies an AC power to one of the conductive patterns 14 and 24 of the stationary element 10 and the movable member 20 to generate an output signal according to a variation in the capacitance between the stationary element 10 and the movable member 20. The signal detecting circuit 50 is connected to a remaining one of the conductive patterns 14 and 24 of the stationary element 10 and the movable member 20 to which no power is being supplied from the AC power supply 40. The signal detecting circuit 50 detects a variation in the capacitance between the stationary element 10 and the movable member 20 and then outputs the variation in the capacitance as an electric signal. The drive unit A is connected to the movable element 20 to move the movable element 20 relative to the stationary element 10 in a parallel direction, thereby creating a displacement therebetween. Therefore, the contact type electric capacitive displacement sensor can reduce a mechanical installation error and an error which may be induced by the discrepancy between a driving direction and a measurement direction. Furthermore, because a displacement error in a direction other than the driving direction is prevented, the reliability of measurement can be enhanced. In addition, since the driving direction corresponds to the measurement direction, installation space can be reduced, and not only a large scale displacement measurement but also a minute displacement measurement can be reliably conducted. Consequently, the overall performance of the sensor can be markedly enhanced.

As such, in the above patent, the conductive patterns (hereinafter, referred to as "electrodes") 14 and 24 which are formed on the stationary plate 10 and the movable plate 20 and coated with the dielectric films 16 and 26 which move relative to each other in parallel in the state in which the dielectric films 16 and 26 are in close contact with each other. Here, a gap d having a predetermined height depending on the thicknesses of the dielectric films 16 and 26 is defined between the upper and lower electrodes. The gap d can be maintained constant by applying slight vertical pressure to the upper and lower electrodes unless the conductive pattern 14, 24 coated with the dielectric film is damaged or deformed. However, as shown in FIG. 2, in the case of an initial alignment error, that is, a yaw directional abbe error by which the movable element is driven in a direction rotated at θ which is a relative angle occurred during installation, rather than the movable element being only moved in the direction of X with the initial alignment error by θ, the initial alignment error may also cause a secondary abbe error in the direction of the initial alignment error even though the error is very minute. Furthermore, even if the secondary abbe error is not induced, it is not easy to detect the already induced abbe error. In addition, when the sensor is operated, a gap or rotation error may occur. Moreover, it is very difficult to correct these errors.

SUMMARY OF THE INVENTION

It is, therefore, an object of the present invention to provide an area-variable type capacitive displacement sensor having a mechanical guide which can correct an initial alignment error and reduce an operation alignment error.

In accordance with an embodiment of the present invention, there is provided an area-variable type capacitive displacement sensor, including: a stationary element having a stationary member, a first conductive pattern being formed on the stationary member; a movable element having a movable member, a second conductive pattern being formed on the movable member such that the second conductive pattern of the movable element faces the first conductive pattern of the stationary element, so that when the movable element moves in parallel to the stationary element, an overlapped area between the first and second conductive patterns is varied; an elastic member for providing a force biasing one of the stationary element and the movable member towards a remaining one thereof in a direction perpendicular to a driving direction so that the stationary element and the movable member are maintained in close contact with each other; a power supply for supplying power to one of the first and second conductive patterns of the stationary element and the movable member to generate an output signal depending on a variation in capacitance between the stationary element and the movable member; a signal detecting circuit connected to a remaining one of the first and second conductive patterns of the stationary element and the movable member to detect the variation in capacitance between the stationary element and the movable member and then output the variation in capacitance as an electric signal; and a guide means for correcting an initial alignment error and reducing an operation alignment error between the stationary element and the movable element.

As described above, an area-variable type capacitive displacement sensor according to the present invention can be easily manufactured and ensure high resolution. Furthermore, the area-variable type capacitive displacement sensor can correct an initial alignment error and reduce operation alignment error. Therefore, the area-variable type capacitive displacement sensor can be applied to a high-precision positioner which uses a capacitive displacement sensor as a feedback sensor, or to a product family including the positioner. In addition, the area-variable type capacitive displacement sensor can be applied to a feedback sensor which must precisely control a relatively long stroke range.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
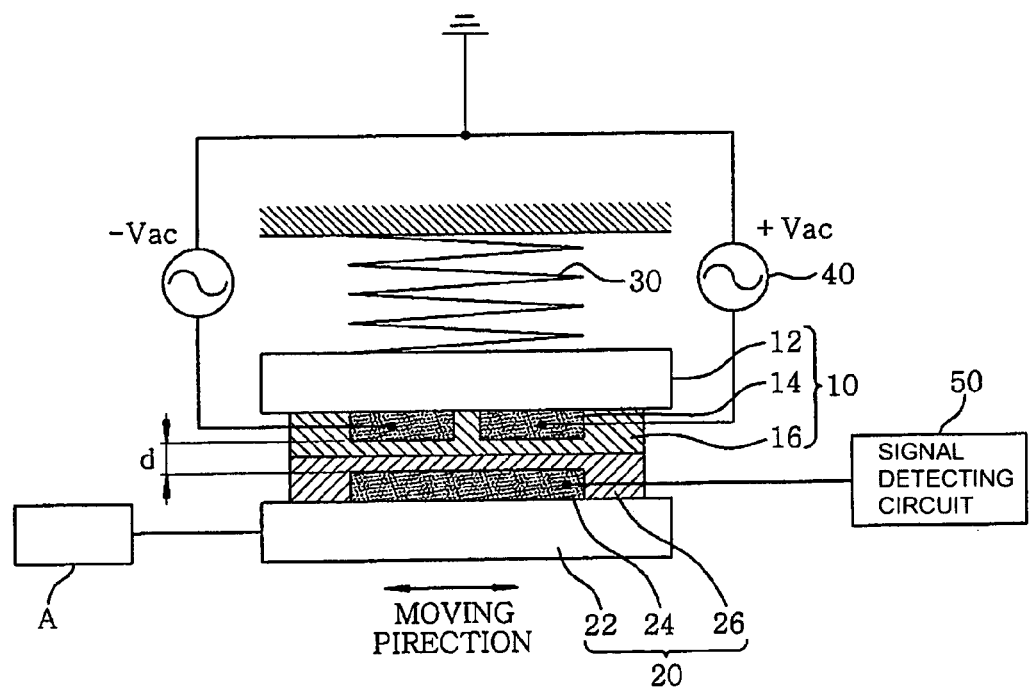
FIG. 1 shows the construction of a conventional contact type electric capacitive displacement sensor.
Figure 2:
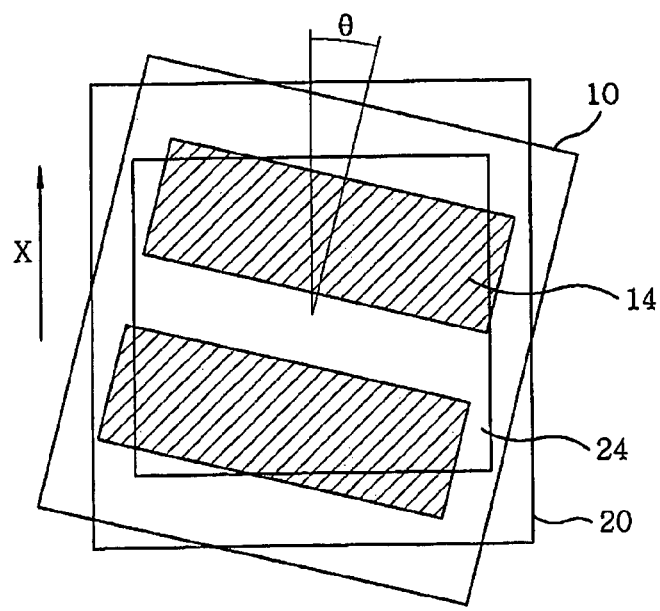
FIG. 2 illustrates an alignment error.

Hereinafter, preferred embodiments of the present invention will be described in detail with reference to the accompanying drawings so that they can be readily implemented by those skilled in the art. In the following description, the same components as those of the conventional art are designated by the same reference numerals, and detailed explanation thereof will be omitted.

FIGS. 3A to 7 illustrate the construction of area-variable type capacitive displacement sensors having mechanical guides, in accordance with embodiments of the present invention.

Figure 3A:
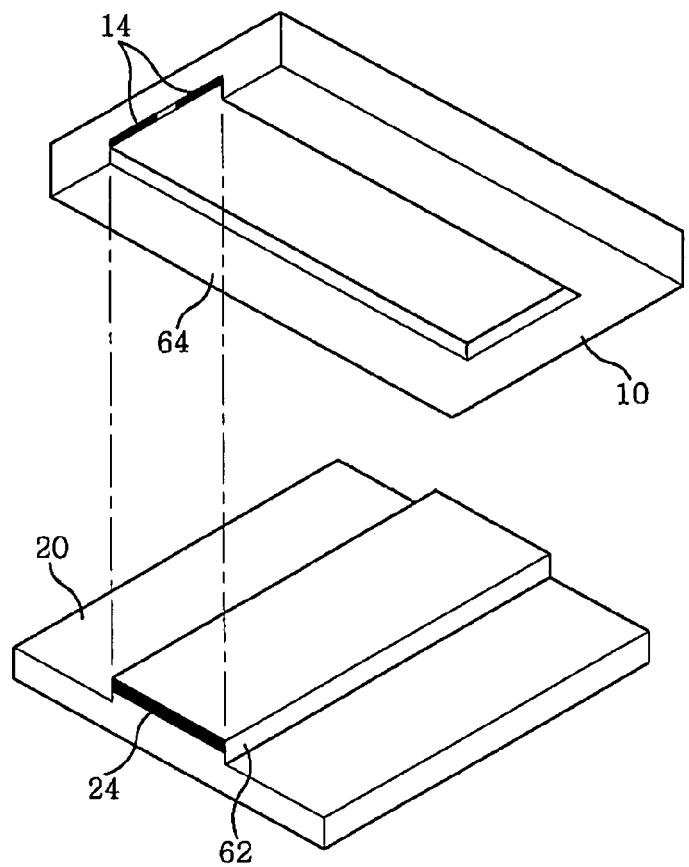
FIGS. 3A and 3B are perspective views showing the construction of an area-variable type capacitive displacement sensor having a mechanical guide, in accordance with a first embodiment of the present invention.
Figure 3B:
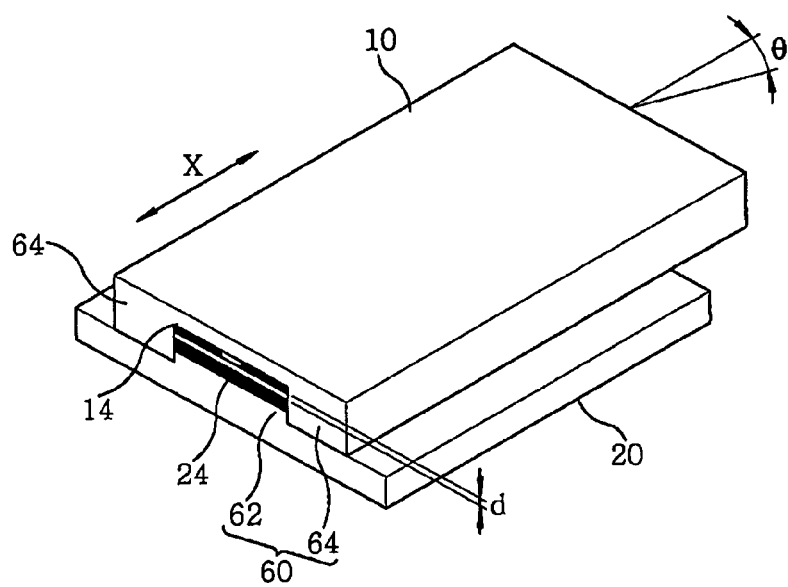

FIGS. 3A and 3B illustrate an area-variable type capacitive displacement sensor in accordance with a first embodiment of the present invention: FIG. 3A is a view showing a lower surface of a stationary element 10 and an upper surface of a movable element 20 which are in a separated state; and FIG. 3B shows an assembled state thereof. As shown in the drawings, the area-variable type capacitive displacement sensor according to the first embodiment of the present invention includes the stationary element 10, the movable element 20, an elastic member 30, a power supply 40, a signal detecting circuit 50 and a guide means 60. The stationary element 10 includes a stationary plate 12 (FIG. 1), and a conductive pattern 14 which is formed in the stationary plate 12. In the same manner as the stationary element 10, the movable element 20 includes a movable plate 22 (FIG. 1), and a conductive pattern 24 which is formed on the movable plate 22 such that the conductive pattern 24 faces the conductive pattern 14 of the stationary element 10. Thus, when the movable element 20 moves with respect to the stationary element 10 in a parallel direction, an overlapped area between the conductive patterns 14 and 24 is varied. The elastic member 30 provides a force used to bias one of the stationary element 10 and the movable member 20 towards the remaining one of them in a direction perpendicular to a driving direction such that the stationary element 10 and the movable member 20 are maintained in the state of being in close contact with each other. The power supply 40 supplies power to one of the conductive patterns 14 and 24 of the stationary element 10 and the movable member 20 to generate an output signal depending on a variation in the capacitance between the stationary element 10 and the movable member 20. The signal detecting circuit 50 is connected to a remaining one of the conductive patterns 14 and 24 of the stationary element 10 and the movable member 20 to which the power supply 40 supplies no power. The signal detecting circuit 50 detects a variation in the capacitance between the stationary element 10 and the movable member 20 and then outputs the variation in the capacitance as an electric signal. The guide means 60 is formed in the driving direction and maintains a gap between the conductive patterns 14 and 24 of the stationary element 10 and the movable element 20 which are in close contact with each other. For the sake of description, the elastic member 30, the power supply 40 and the signal detecting circuit 50 are not shown in the drawings.

Referring to FIGS. 3A and 3B, the guide means 60 includes an insert protrusion 62 which protrudes upwards with a predetermined height from a central portion of the movable element 20, and a pair of guide protrusions 64 which protrude downwards from the stationary element 10. Here, the conductive pattern 14 of the stationary element 10 is formed on the bottom of a space defined between the guide protrusions 64. The conductive pattern 24 of the movable element 20 is provided on the upper surface of the insert protrusion 62. When the insert protrusion 62 is inserted between the guide protrusions 64, a gap d is defined between the conductive pattern 24 formed on the upper surface of the insert protrusion 62 of the movable element 10 and the conductive pattern 14 formed on the bottom of the space between the guide protrusions 64 of the stationary element 10.

The area-variable type capacitive displacement sensor having the above-mentioned construction is configured to insert the inset protrusion 62 between the guide protrusions 64, so that a yaw error in initial alignment cannot be greater than a manufacturing error. Hence, a degree of freedom in the yaw direction is mechanically limited. Furthermore, although the movable element 20 moves in a manner shown in FIG. 3$b$, because the insert protrusion 62 is guided by the guide protrusions 64, the movable element 20 is constrained from becoming biased in the direction of $\theta$ due to an abbe error.

Figure 4A:
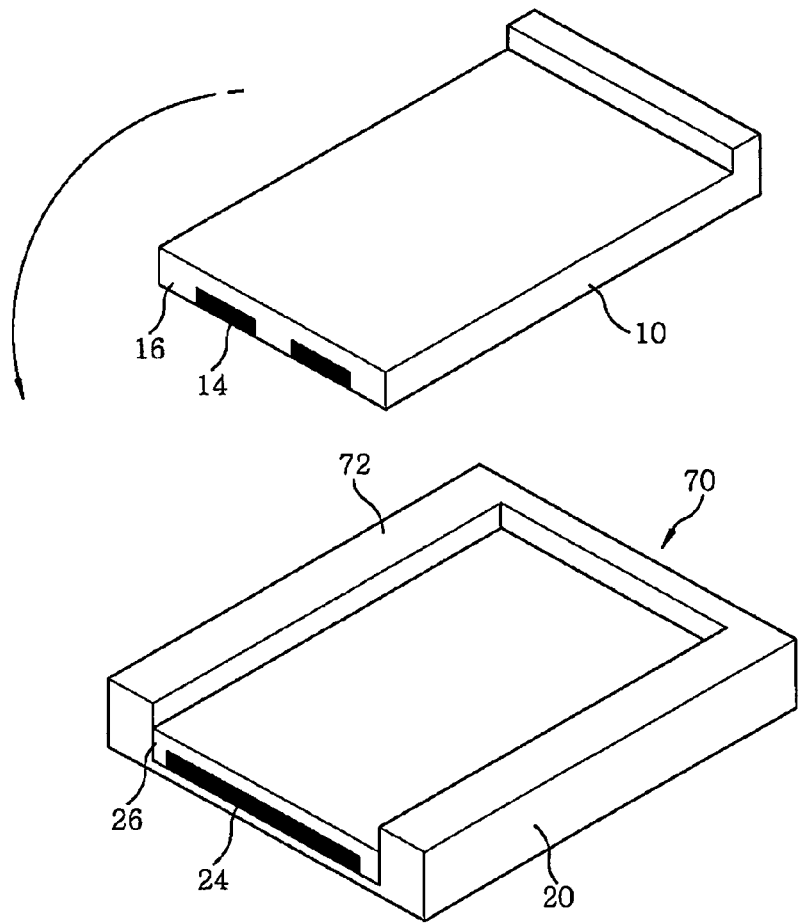
FIGS. 4A and 4B are perspective views showing the construction of an area-variable type capacitive displacement sensor having a mechanical guide, in accordance with a second embodiment of the present invention.
Figure 4B:
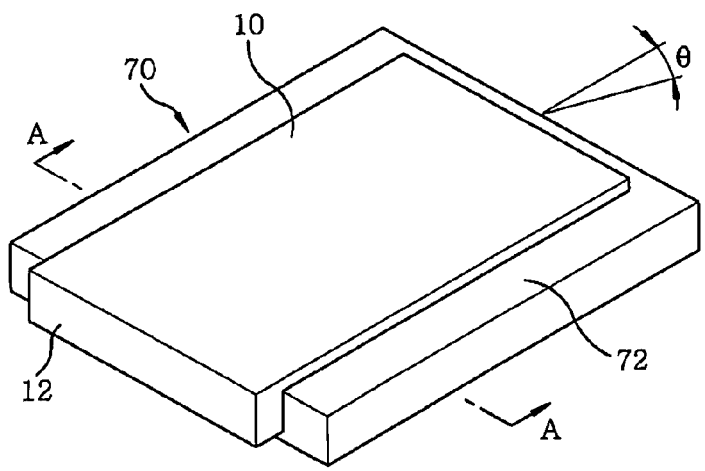
Figure 5:
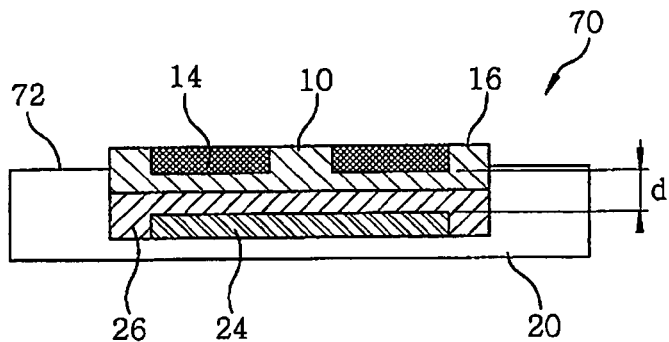
FIG. 5 is a cross sectional view taken along the line A-A of FIG. 4B.

FIGS. 4A and 4B illustrate an area-variable type capacitive displacement sensor in accordance with a second embodiment of the present invention: FIG. 4$a$ is a view showing a lower surface of a stationary element 10 and an upper surface of a movable element 20 which are in a separated state; and FIG. 4$b$ shows an assembled state thereof. As shown in the drawings, a guide means 70 includes a pair of guide protrusions 72 which protrude with a predetermined height upwards from the movable element 20. As shown in FIG. 5, conductive patterns 14 and 24 are each evenly coated with thin dielectric films 16 and 26 such that when the stationary element 10 is inserted between the guide protrusions 72, a gap is defined between the conductive pattern 14 of the stationary element 10 and the conductive pattern 24 of the movable element 20.

The second embodiment of FIG. 4 is also configured to insert the stationary element 10 between the guide protrusions 72, so that a yaw error in initial alignment cannot be greater than a manufacturing error. Thus, a degree of freedom in the yaw direction is mechanically limited. Furthermore, although the movable element 20 moves in a manner shown in FIG. 4$b$, because it is guided by the guide protrusions 72, the movable element 20 is constrained from becoming biased in the direction of $\theta$ due to an abbe error.

Figure 6A:
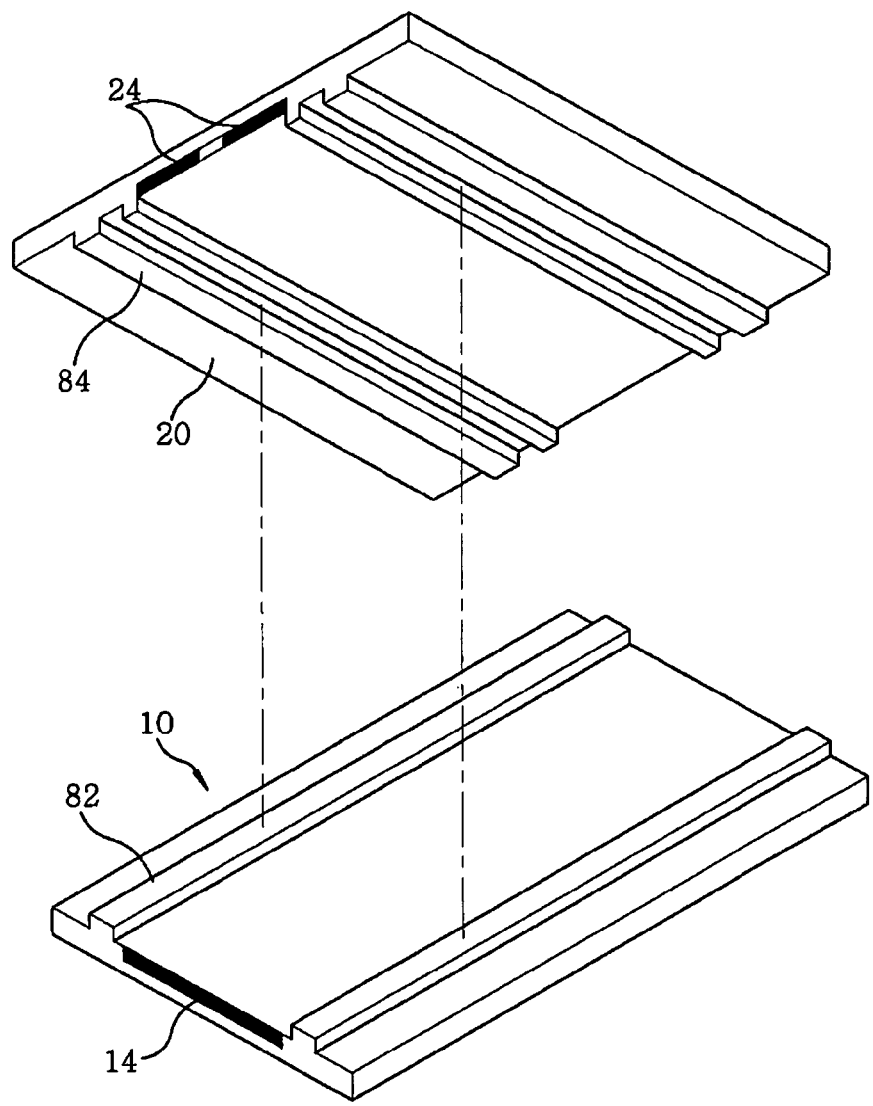
FIGS. 6A and 6B are perspective views showing the construction of an area-variable type capacitive displacement sensor having a mechanical guide, in accordance with a third embodiment of the present invention.
Figure 6B:
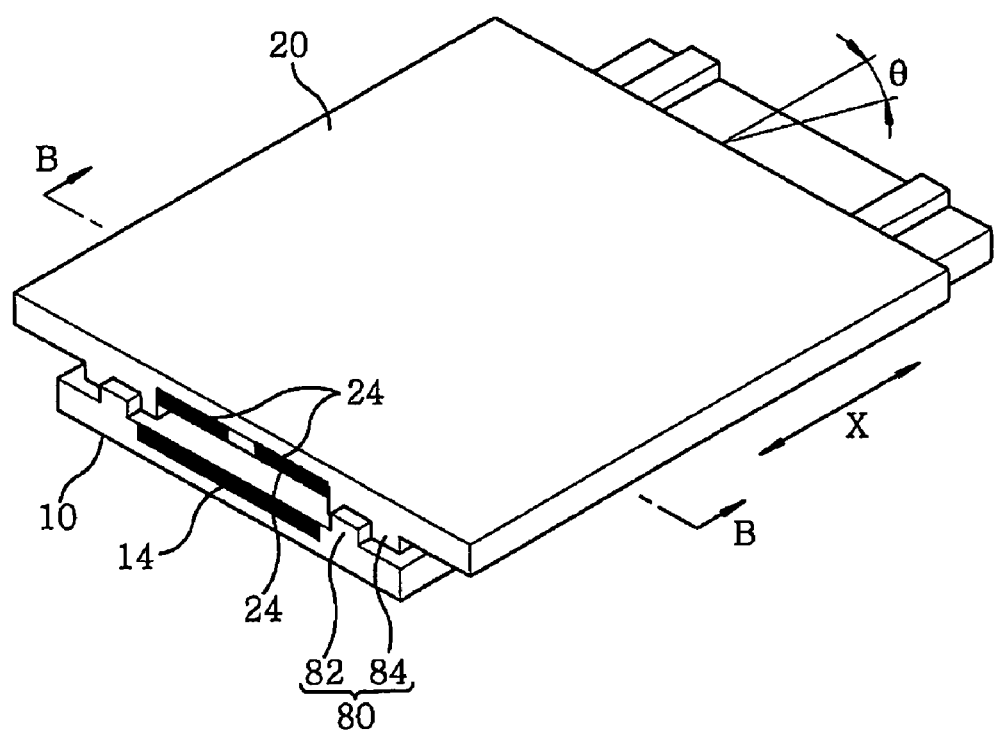

FIGS. 6A and 6B illustrate an area-variable type capacitive displacement sensor in accordance with a third embodiment of the present invention: FIG. 6$a$ is a view showing an upper surface of a stationary element 10 and a lower surface of a movable element 20 which are in a separated state; and FIG. 6$b$ shows an assembled state thereof. As shown in the drawings, a guide means 80 includes a pair of insert protrusions 82 which protrude upwards with a predetermined distance from the stationary element 10, and two pairs of guide protrusions 84 which protrude downwards from the movable element 20.

Figure 7:
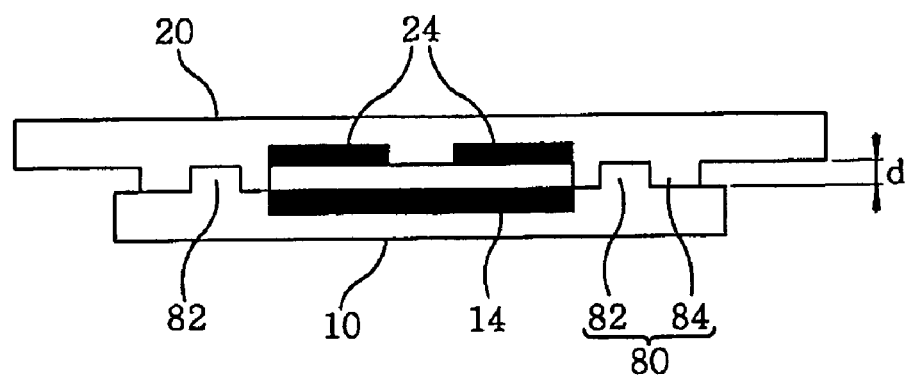
FIG. 7 is a cross sectional view taken along the line B-B of FIG. 6B.

In the third embodiment of FIGS. 6A and 6B, a conductive pattern 14 is formed on the upper of a space defined between the insert protrusions 82 of the stationary element 10. A conductive pattern 24 is formed on the lower surface of the movable element 20 between the guide protrusions 84. When the insert protrusions 82 of the stationary element 10 are inserted into the guide protrusions 84 of the movable element 20 as shown in FIG. 7, a gap is defined between the conductive patterns 84 and 82. Furthermore, the operation of the third embodiment is the same as that of the first or second embodiment, therefore further explanation is deemed unnecessary.

As such, in the area-variable type capacitive displacement sensor according to the present invention, the stationary element can limit a degree of freedom in a yaw direction of the movable element which moves relative to the stationary element. Here, in the case of the first and third embodiments, the height of the gap between the conductive patterns can be adjusted by adjusting the height of the insert protrusion. In the case of the second embodiment, the gap between the conductive patterns is defined by the dielectric films, so that the height thereof can be adjusted by adjusting the thickness of the dielectric films.

Therefore, if the sensor has no guide means, even when the movable element is moved in a direction displaced at an angle of $\theta$, it cannot be checked. However, in the area-variable type capacitive displacement sensor of the present invention, the guide means limits a force with which the movable element moves relative to the stationary element in a direction displaced at an angle of $\theta$. If the force exceeds the bearing force of the guide means, the guide means will be broken, thus letting a user know that a large abbe error exists.

While the invention has been shown and described with respect to the preferred embodiments, it will be understood by those skilled in the art that various changes and modifications may be made without departing from the spirit and scope of the invention as defined in the following claims.

The invention claimed is:

1. An area-variable type capacitive displacement sensor, comprising:

a stationary element having a stationary member and a first conductive pattern being formed on the stationary member;

a movable element having a movable member and a second conductive pattern being formed on the movable member such that the second conductive pattern of the movable element is parallel to the first conductive pattern of the stationary element, so that when the movable element moves in parallel to the stationary element, an overlapped area between the first and second conductive patterns is varied;

an elastic member for providing a force biasing one of the stationary element and the movable element towards a remaining one thereof in a direction perpendicular to a driving direction so that the stationary element and the movable element are maintained in close contact with each other;

a power supply for supplying power to one of the first and second conductive patterns of the stationary element and the movable element to generate an output signal depending on a variation in capacitance between the stationary element and the movable element;

a signal detecting circuit connected to a remaining one of the first and second conductive patterns of the stationary element and the movable element to detect the variation in capacitance between the stationary element and the movable element and then output the variation in capacitance as an electric signal; and a guide means for correcting an initial alignment error and reducing an operation alignment error between the stationary element and the movable element, and wherein the guide means includes:

an insert protrusion protruding upwards from a central portion of the movable element by a predetermined height; and a pair of guide protrusions protruding downwards from the stationary element;

wherein the first conductive pattern of the stationary element is formed on a bottom of a space defined between the guide protrusions, and the second conductive pattern of the movable element is protruded upward to form the insert protrusion, such that the gap is defined between the first conductive pattern of the stationary element and the second conductive pattern of the movable element wherein at least a part of the first and second conductive patterns is protruded upward or downward to form the guide means.

* * * * *